(12) United States Patent
Zhang et al.

(10) Patent No.: US 8,885,616 B2
(45) Date of Patent: Nov. 11, 2014

(54) ENHANCING SOUNDING REFERENCE SIGNALS (SRS)

(75) Inventors: Xiaoxia Zhang, San Diego, CA (US); Wanshi Chen, San Diego, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 13/546,657

(22) Filed: Jul. 11, 2012

(65) Prior Publication Data

US 2013/0016705 A1    Jan. 17, 2013

Related U.S. Application Data

(60) Provisional application No. 61/507,487, filed on Jul. 13, 2011.

(51) Int. Cl.
*H04W 72/04* (2009.01)
*H04W 28/06* (2009.01)
*H04L 5/00* (2006.01)
*H04L 27/26* (2006.01)
*H04W 72/00* (2009.01)

(52) U.S. Cl.
CPC .............. *H04L 5/0048* (2013.01); *H04W 28/06* (2013.01); *H04L 5/0035* (2013.01); *H04L 27/2613* (2013.01); *H04L 5/0091* (2013.01); *H04W 72/00* (2013.01)
USPC ......................................................... 370/336

(58) Field of Classification Search
None
See application file for complete search history.

(56) References Cited

U.S. PATENT DOCUMENTS

| 8,014,265 | B2 | 9/2011 | Sarkar et al. |
| 2010/0074205 | A1* | 3/2010 | Papasakellariou et al. ... 370/329 |
| 2010/0265910 | A1 | 10/2010 | Suo et al. |
| 2010/0322115 | A1 | 12/2010 | Wei et al. |
| 2011/0058505 | A1 | 3/2011 | Pan et al. |
| 2011/0199944 | A1 | 8/2011 | Chen et al. |
| 2012/0039273 | A1* | 2/2012 | Nam et al. ..................... 370/329 |

FOREIGN PATENT DOCUMENTS

| EP | 2315482 A1 | 4/2011 |
| EP | 2337384 A1 | 6/2011 |
| EP | 2421178 A2 | 2/2012 |
| WO | 2011071291 A2 | 6/2011 |

OTHER PUBLICATIONS

Catt et al: "Considerations on Enhanced SRS Transmission Schemes", 3GPP Draft; R1-100023, 3rd Generation Partnership Project (3GPP), Mobile Competence Centre; 650, Route Deslucioles; F-06921 Sophia-Antipolis Cedex; France, vol. RAN WG1, no. Valencia, Spain; 20100118, Jan. 12, 2010, XP050417779, [retrieved on Jan. 12, 2010) sections 2.1-2.3.

(Continued)

*Primary Examiner* — Huy D Vu
*Assistant Examiner* — Teisha D Hall
(74) *Attorney, Agent, or Firm* — Austin Rapp & Hardman

(57) ABSTRACT

A method for enhancing a sounding reference signal (SRS) in a non-root wireless communication device is disclosed. The method determines that all SRS transmissions for the wireless communication device are to occur in an uplink pilot time slot (UpPTS) portion of a transition subframe. The method also determines whether available uplink bandwidth for the UpPTS portion is greater than available uplink bandwidth for a normal uplink subframe. A current SRS is transmitted using the available uplink bandwidth for UpPTS portion when the available uplink bandwidth for the UpPTS portion is greater than available uplink bandwidth for the normal uplink subframe.

52 Claims, 8 Drawing Sheets

(56) References Cited

OTHER PUBLICATIONS

International Search Report and Written Opinion—PCT/US2012/046543—ISA/EPO—Oct. 23, 2012.
Nokia Siemens Networks et al: "Channel sounding enhancements for LTE-Advanced uplink" 3GPP Draft; R1-101911, 3rd Generation Partnership Project (3GPP), Mobile Competence Centre, vol. RAN WG1, Apr. 6, 2010, pp. 1-3, XP050419258, France [retrieved on Apr. 6, 2010] p. 1.
ZTE: "Remaining Issues of SRS Bandwidth configuration in UpPTS", 3GPP Draft; R1-083600, 3rd Generation Partnership Project (3GPP), Mobile Competence Centre, Sep. 24, 2008, pp. 1-4, XP050316962, France [retrieved on Sep. 24, 2008] the whole document.
ZTE: "Views on Rel-11 CoMp", 3GPP Draft; R1-110573, 3rd Generation Partnership Project (3GPP) Mobile Competence Centre, vol. RAN WG1, Jan. 21, 2011, pp. 1-2, XP050490430, France [retrieved on Jan. 21, 2011] Section 2.5.

* cited by examiner

ENHANCING SOUNDING REFERENCE SIGNALS (SRS)

RELATED APPLICATIONS

This application is related to and claims priority from U.S. Provisional Patent Application Ser. No. 61/507,487, filed Jul. 13, 2011, for "Enhancing Sounding Reference Signals (SRS)" and incorporated herein in its entirety.

TECHNICAL FIELD

The present disclosure relates generally to electronic devices for communication systems. More specifically, the present disclosure relates to enhancing sounding reference signals.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Wireless communication systems are widely deployed to provide various types of communication content such as voice, video, data and so on. These systems may be multiple-access systems capable of supporting simultaneous communication of multiple wireless communication devices with one or more base stations.

It may be advantageous to determine characteristics of the physical channel on which the devices transmit. Therefore, benefits may be realized by systems and methods for enhancing sounding reference signals (SRS) used for estimating channels.

SUMMARY

A method for enhancing a sounding reference signal (SRS) in a non-root wireless communication device is disclosed. The method determines that all SRS transmissions for the wireless communication device are to occur in an uplink pilot time slot (UpPTS) portion of a transition subframe. The method also determines whether available uplink bandwidth for the UpPTS portion is greater than available uplink bandwidth for a normal uplink subframe. A current SRS is transmitted using the available uplink bandwidth for UpPTS portion when the available uplink bandwidth for the UpPTS portion is greater than available uplink bandwidth for the normal uplink subframe.

The current SRS may be transmitted using the available uplink bandwidth for the normal uplink subframe when the available uplink bandwidth for the UpPTS portion is not greater than available uplink bandwidth for the normal uplink subframe. Determining that all SRS transmissions are to occur in the UpPTS portion may include receiving an indication from a base station. The available uplink bandwidth for a normal uplink subframe may be received. The available uplink bandwidth for a normal uplink subframe may account for multiple cells in a coordinated multi-point (CoMP) set.

The available uplink bandwidth for the UpPTS portion of a transition subframe may be received. The available uplink bandwidth for the UpPTS portion may account for multiple cells in a coordinated multi-point (CoMP) set. In one configuration, a Physical Random Access Channel (PRACH) indicator may be received that indicates a number of resource blocks allocated to PRACH format 4 data for a serving cell. The PRACH indicator may also indicates a number of resource blocks allocated to PRACH format 4 data for at least one non-serving cell in the CoMP set. The indicator may be received from the serving cell.

In another configuration, an indicator of all cells in the CoMP set may be received from a serving cell. Separate PRACH indicators of a number of resource blocks allocated to PRACH format 4 data may be received for each cell in the CoMP set. The PRACH indicators may be received from each cell in the CoMP set.

In another configuration, an explicit Physical Random Access Channel (PRACH) indicator may be received that indicates a number of resource blocks allocated to PRACH format 4 data for a serving cell and for at least one non-serving cell in the CoMP set. The indicator may be received from the serving cell.

Transmitting may include allocating extra bandwidth available for the UpPTS portion to wireless communication devices operating on an edge of the available uplink bandwidth for the UpPTS portion. Furthermore, a random access response (RAR) grant that includes a reserved bit that indicates that aperiodic SRS should be triggered may be received. The determining that all SRS transmissions for the wireless communication device are to occur in the UpPTS portion may include determining that all SRS transmissions for all wireless communication devices served by a base station are to occur in the UpPTS portion.

An apparatus for enhancing a sounding reference signal (SRS) in a non-root wireless communication device is also disclosed. The apparatus includes a processor and memory in electronic communication with the processor. Executable instructions are stored in the memory. The instructions are executable to determine that all SRS transmissions for the wireless communication device are to occur in an uplink pilot time slot (UpPTS) portion of a transition subframe. The instructions are also executable to determine whether available uplink bandwidth for the UpPTS portion is greater than available uplink bandwidth for a normal uplink subframe. The instructions are also executable to transmit a current SRS using the available uplink bandwidth for the UpPTS portion when the available uplink bandwidth for the UpPTS portion is greater than available uplink bandwidth for the normal uplink subframe An apparatus for enhancing a sounding reference signal (SRS) in a non-root wireless communication device is also disclosed. The apparatus includes means for determining that all SRS transmissions for the wireless communication device are to occur in an uplink pilot time slot (UpPTS) portion of a transition subframe. The apparatus also includes means for determining whether available uplink bandwidth for the UpPTS portion is greater than available uplink bandwidth for a normal uplink subframe. The apparatus also includes means for transmitting a current SRS using the available uplink bandwidth for the UpPTS portion when the available uplink bandwidth for the UpPTS portion is greater than available uplink bandwidth for the normal uplink subframe.

A computer-program product for enhancing a sounding reference signal (SRS) in a non-root wireless communication device is also disclosed. The computer-program product comprises a non-transitory computer-readable medium having instructions thereon. The instructions include code for causing the wireless communication device to determine that all SRS transmissions for the wireless communication device are to occur in an uplink pilot time slot (UpPTS) portion of a transition subframe. The instructions also include code for causing the wireless communication device to determine whether available uplink bandwidth for the UpPTS portion is greater than available uplink bandwidth for a normal uplink subframe. The instructions also include code for causing the wireless communication device to transmit a current SRS using the available uplink bandwidth for the UpPTS portion when the available uplink bandwidth for the UpPTS portion is greater than available uplink bandwidth for the normal uplink subframe.

DETAILED DESCRIPTION

In wireless communication systems, physical uplink channels may be estimated to increase efficiency. For example, Long Term Evolution Advanced (LTE-A) uses a sounding reference signal (SRS) sent from a user equipment (UE) to an evolved Node B (eNodeB) to estimate an uplink channel. The SRS may be more accurate as more channel resources are allocated to describing SRS. Therefore, the present systems and methods may enhance the SRS by allocating more resource blocks when circumstances permit. Specifically, the SRS transmission bandwidth from a UE may be maximized during uplink pilot timeslot (UpPTS).

Figure 1:
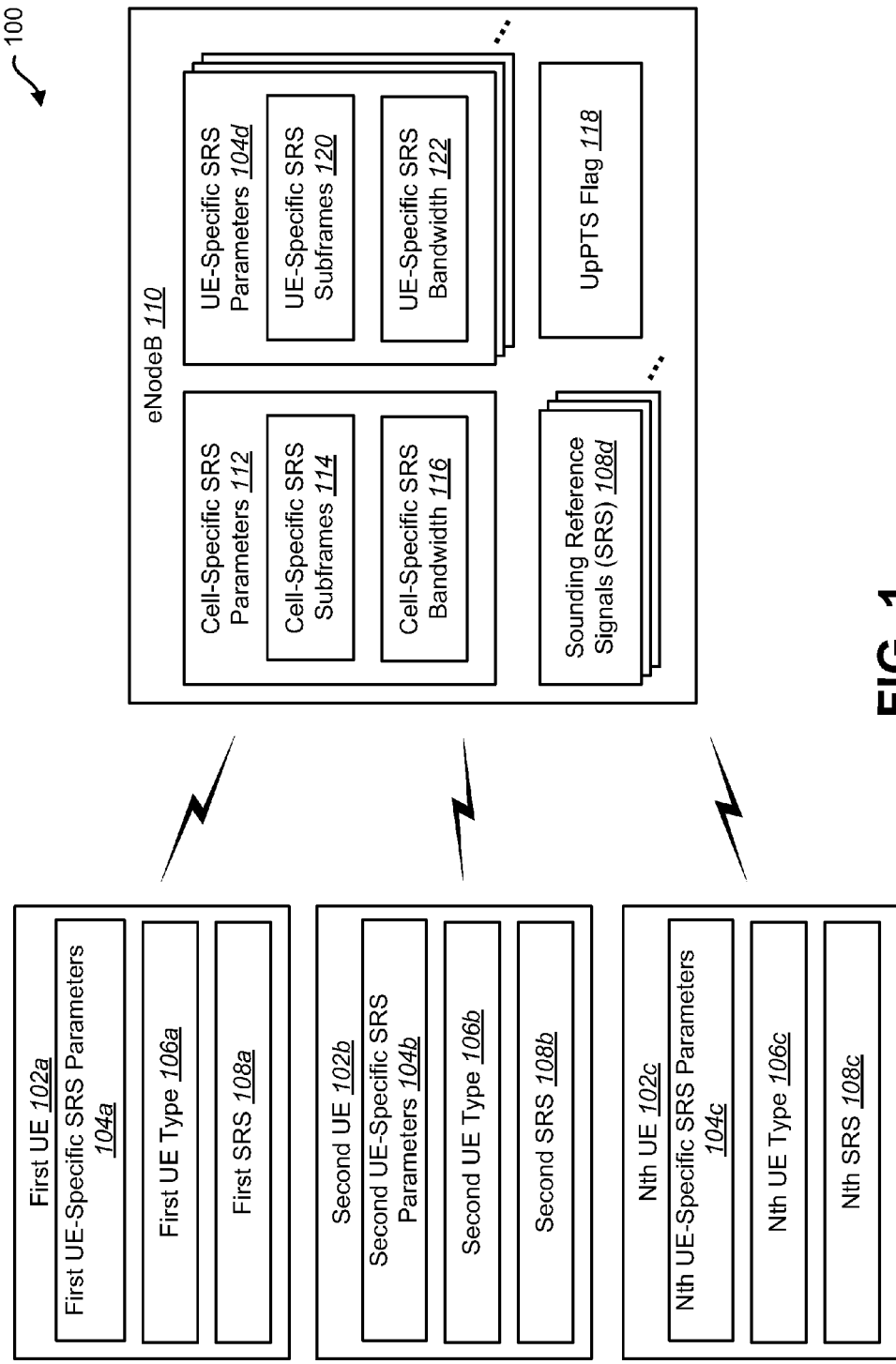
FIG. 1 is a block diagram illustrating a wireless communication system that enhances sounding reference signals (SRS)

FIG. 1 is a block diagram illustrating a wireless communication system 100 that enhances sounding reference signals (SRS) 108a-d. The system may include an eNodeB 110 and one or more user equipments (UEs) 102a-c that communicate with the eNodeB 110. Although illustrated with a single eNodeB 110 and N UEs 102a-c, the system may include any suitable number of eNodeBs 110 and UEs 102a-c.

In one configuration, the wireless communication system 100 may be implemented using LTE-A. Although described and illustrated with respect LTE-A, the present systems and methods may be used with any suitable wireless communication system. Therefore, the UEs 102a-c may be any electronic devices that may be used for wireless voice communication, data communication or both. A UE 102a-c may alternatively be referred to as a wireless communication device, an access terminal, a mobile terminal, a mobile station, a remote station, a user terminal, a terminal, a subscriber unit, a subscriber station, a mobile device, a wireless device or some other similar terminology. Examples of UEs 102a-c include cellular phones, personal digital assistants (PDAs), handheld devices, wireless modems, laptop computers, personal computers, etc. The eNodeB 110 is a wireless communication station that is installed at a fixed location and used to communicate with wireless communication devices. An eNodeB 110 may alternatively be referred to as a base station, an access point, a Node B or some other similar terminology.

In LTE-A, sounding reference signals (SRS) 108a-d may be used to estimate the uplink channel. For example, a first UE 102a may send a first SRS 108a to estimate the uplink channel between the eNodeB 110 and the first UE 102a. Similarly, a second UE 102b may send a second SRS 108b and an Nth UE 102c may send an Nth SRS 108c to the eNodeB 110 for estimating the uplink channels between the eNodeB 110 and the second and Nth UEs 102c, respectively. Even though the SRS 108a-c is sent from the UE 102a-c, it may also be used to estimate the downlink channel in time-division duplex (TDD) systems because, using channel reciprocity, the downlink channel may be similar to the uplink channel. Therefore, the SRS 108a-c may be used for uplink rate adaptation (and downlink rate adaptation if channel reciprocity can be exploited, e.g., in TDD).

The eNodeB 110 may include a set of cell-specific SRS parameters 112. The cell-specific SRS parameters 112 may include cell-specific SRS subframes 114 that indicate SRS transmissions for an entire cell and a cell-specific SRS bandwidth 116 that indicates a maximum possible SRS transmission bandwidth in a cell. In other words, the cell-specific SRS parameters 112 may include information applicable to an entire cell (i.e., all UEs 102a-c served by an eNodeB 110), rather than a single UE 102a-c. The eNodeB 110 may also include UE-specific SRS parameters 104d. The UE-specific SRS parameters 104d may include UE-specific SRS subframes 120 that indicate UE-specific SRS transmission instances for a UE 102a-c, i.e., the UE-specific SRS subframes 120 may be a subset of the cell-specific SRS subframes 114. A UE-specific SRS bandwidth 122 may indicate the SRS bandwidth allocated for a particular UE 102a-c. For example, for a particular cell-specific SRS bandwidth 116, a UE 102a-c may be allocated one of four possible SRS bandwidths, denoted by $m_{SRS,b}$ where b=0, 1, 2 or 3, i.e., each UE 102a-c may have a type 106a-c of root, intermediate or leaf. For example, b=0 may indicate a root UE 102a-c, b=1 or 2 may indicate an intermediate UE 102a-c and b=3 may indicate a leaf UE 102a-c. If b=0 for a UE 102a-c (i.e., a root UE 102a-c), the UE-specific SRS bandwidth 122 may be the same as the cell-specific SRS bandwidth 116. If b>0 for a UE 102a-c (i.e., a leaf or intermediate UE 102a-c), the UE-specific SRS bandwidth 122 may be smaller than the cell-specific SRS bandwidth 116. A UE 102a-c may be configured to hop around in the cell-specific SRS bandwidth 116 during different transmission instances, e.g., cycling through the entire cell-specific SRS bandwidth 116 or a fraction of the cell-specific SRS bandwidth 116. Furthermore, the UE-specific SRS parameters 104a-d may include information related to timing and cyclic shift for individual UEs 102a-c.

In TDD, the same bandwidth may be used to carry uplink and downlink information, i.e., a single radio frame may include both uplink and downlink subframes. A special transition frame may be used to transition between the downlink frames and uplink frames. In the special transition subframe, the first symbols may be used for downlink information, followed by a guard period and uplink symbols. The guard period may allow the eNodeB 110 power to dissipate enough so that uplink symbols can be transmitted reliably.

In one configuration, the special transition frame may only allocate one or two symbols for uplink symbols. These uplink symbols in the special transition frame may be referred to as the uplink pilot timeslot (UpPTS). However, instead of carrying uplink data, the UpPTS portion may be used to transmit the SRS 108a-d and Physical Random Access Channel (PRACH) format 4 data. For example, the eNodeB 110 may broadcast to all UEs 102a-c about the PRACH format 4 data resources.

The use of UpPTS using TDD is described in 3GPP TS 36.211 V9.0.0, section 5.5.3.2:

"For UpPTS, $m_{SRS,0}$ shall be reconfigured to $m_{SRS,0}^{max} = \max_{c \in C}\{m_{SRS,0}^{c}\} \leq (N_{RB}^{UL} - 6N_{RA})$ if this reconfiguration is enabled by the cell-specific parameter srsMax-UpPts given by higher layers, otherwise if the reconfiguration is disabled $m_{SRS,0}^{max} = m_{SRS,0}$, where c is a SRS BW configuration and $C_{SRS}$ is the set of SRS BW configurations from the Tables 5.5.3.2-1 to 5.5.3.2-4 for each uplink bandwidth $N_{RB}^{UL}$, $N_{RA}$ is the number of format 4 PRACH in the addressed UpPTS and derived from Table 5.7.1-4."

In other words, it may be advantageous to use the entire available UpPTS portion for SRS 108a-d, i.e., only excluding the bandwidth allocated for PRACH format 4 data when transmitting SRS 108a-d in the UpPTS portion. Specifically, for root UEs 102a-c, a UpPTS flag 118 may indicate when all the available UpPTS is to be used to transmit the SRS 108a-d, i.e., only excluding the bandwidth allocated for PRACH format 4 data. For example, the UpPTS flag 118 (e.g., srsMax-UpPts) may be set by an eNodeB 110 and broadcast to all UEs 102a-c. Therefore, in some configurations (e.g., according to TS 36.211), root UEs 102a-c may be permitted to use the maximum uplink sounding bandwidth available in UpPTS by only excluding the bandwidth allocated for PRACH format 4 data. However, only permitting root UEs 102a-c to maximize the SRS bandwidth is inefficient, as discussed below.

Therefore, in addition to increasing the UE-specific SRS bandwidth 122 for root UEs 102a-c, the present systems and methods may increase the UE-specific SRS bandwidth 122 for leaf UEs 102a-c and intermediate UEs 102a-c, i.e., UEs 102a-c that would otherwise not be able to use the entire UpPTS for SRS 108a-d transmission. The extra UpPTS bandwidth utilized by the present systems and methods may otherwise be unused.

As used herein, the terms "available UpPTS portion," "available SRS bandwidth," "available uplink bandwidth," "$m_{SRS,0/1/2/3}$ (UpPTS)," or "$m_{SRS,0/1//3}$ (regular uplink subframe)" refer to the amount of available bandwidth that may be used for SRS transmissions. For example, in UpPTS, these terms may refer to the system bandwidth in UpPTS minus the bandwidth allocated for PRACH format 4 data. In other words, depending on the situation, a UE 102a-c may utilize almost all of the UpPTS bandwidth, but not the bandwidth allocated for PRACH format 4. In a regular uplink subframe, the "available SRS bandwidth" or "available uplink bandwidth" may refer to the allocated SRS bandwidth.

Figure 2:
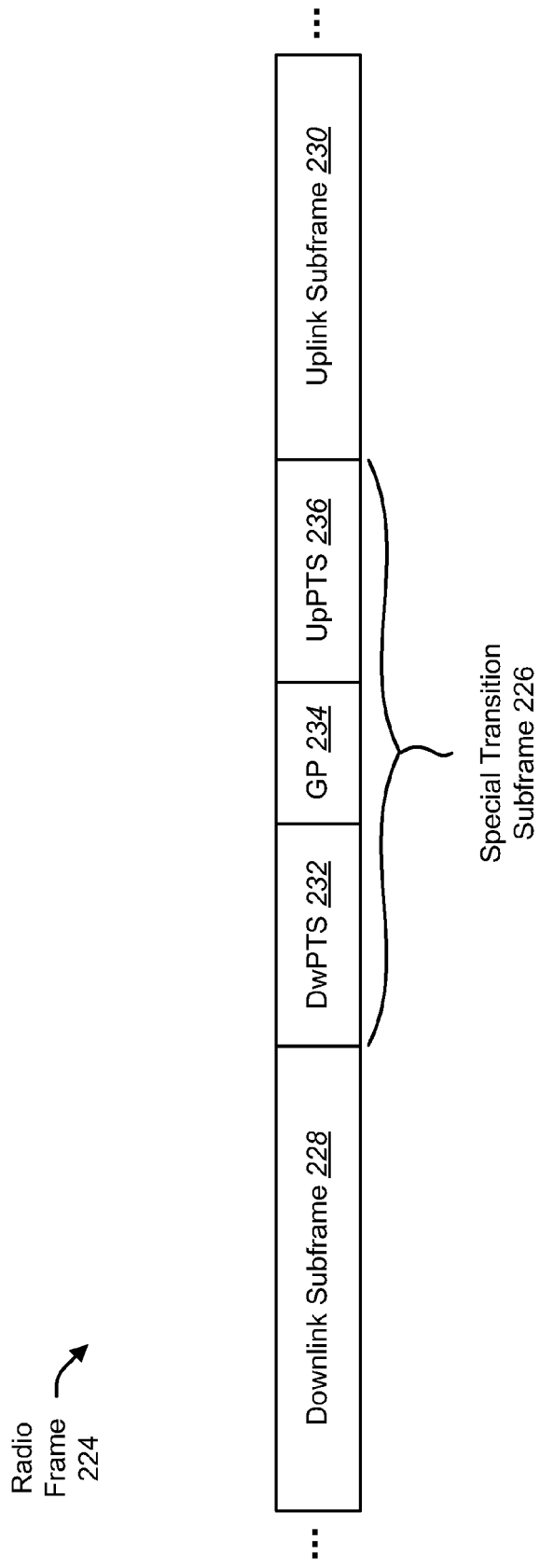
FIG. 2 is a block diagram illustrating a special transition subframe in a radio frame.

FIG. 2 is a block diagram illustrating a special transition subframe 226 in a radio frame 224. The radio frame 224 may include a downlink subframe 228, to carry downlink data and control, and an uplink subframe 230 used to carry uplink data and control. While the radio frame 224 is shown as including only a single downlink subframe 228 and a single uplink subframe 230, more than one downlink subframe 228 and more than one uplink subframe 230 may be included in the radio frame 224. At a transition from a downlink subframe 228 to an uplink subframe 230, a special transition subframe 226 may be used to carry both downlink information and uplink information. Specifically, the special transition subframe 226 may include a downlink pilot time slot (DwPTS) 232, a guard period (GP) 234 and an uplink pilot time slot (UpPTS) 236. The guard period (GP) 234 may allow the eNodeB 110 power to dissipate so that the uplink information transmitted in during the UpPTS 236 portion may be reliably received.

In one configuration, each subframe in the radio frame 224 is 1 millisecond. Therefore, the uplink subframe 230 may be used to transmit data, control, SRS, Physical Random Access Channel (PRACH) format 4 data or some combination. But, because the UpPTS portion 236 of a special transition subframe 226 may only have one or two uplink symbols, it may be limited to transmitting the SRS 108a-d or PRACH format 4, i.e., because the UpPTS portion 236 does not include as many resource blocks (RBs) as regular uplink subframes 230. As discussed below, the present systems and methods may maximize the available UpPTS portion to transmit SRS 108a-d.

In one configuration, the available UpPTS portion may be determined by discounting the number of RBs used for format 4 PRACH for the cell, i.e., the eNodeB 110 may determine the bandwidth and send it to the UEs 102a-c. In Rel-11 and beyond, multiple receiving processors (e.g., multiple eNodeBs 110 and/or remote radio heads (RRHs) in a coordinated multi-point (CoMP) set) may want to detect PRACH by orthogonalizing PRACH resources.

However, in a CoMP set, simply discounting the format 4 PRACH bandwidth of the serving cell may not be enough because the UE 102a-c may be receiving signals from more than one eNodeB 110 in the CoMP set. So, in a first option, the serving cell may purposely increase the number of RBs required for format 4 PRACH data to include the bandwidth for format 4 PRACH data for all cells in the CoMP set, i.e., implicitly signaling the UE 102a-c the number of RBs for all cells in the CoMP set. In a second option, the eNodeB 110 may signal the CoMP set to UE 102a-c (e.g., in System Information Block 2 (SIB2)) and UE 102a-c may listen to all the cells in the CoMP set to learn how many format 4 PRACH RBs are needed. In a third option, an eNodeB 110 uses an entirely new signaling to inform the UE 102a-c of the available sounding bandwidth that accounts for the PRACH format 4 data in the CoMP set.

Furthermore, a UE 102a-c may transmit the SRS 108a-d only once. This is called aperiodic SRS (A-SRS). Some uplink and downlink control information (DCI) formats have one or two bits included for aperiodic SRS triggering if configured by higher layers. Instead of using DCI, however, free bits in random access response (RAR) grants may be used to trigger aperiodic SRS, i.e., one bit may be added in RAR to trigger A-SRS for non-contention-based random access procedure. The MAC RAR is of fixed size (48 bits) and includes a reserved bit (set to "0"), a timing advanced command field (11 bits), an uplink grant field (20 bits) and a temporary C-RNTI (cell radio network temporary identifier) field (16 bits). Using the reserved bit in the RAR may not have a legacy impact and may not increase the payload size of the RAR.

Figure 3:
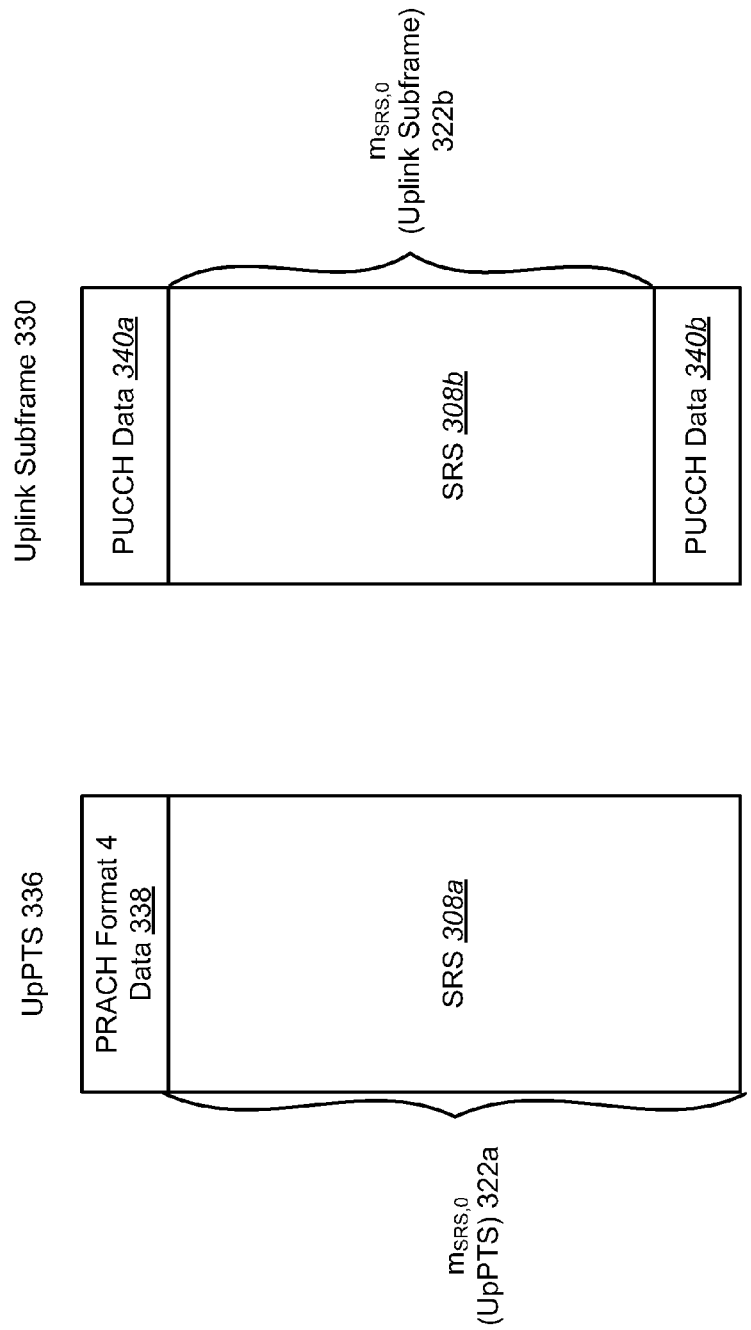
FIG. 3 is a block diagram illustrating relative sounding reference signal (SRS) allocation in an uplink pilot time slot (UpPTS) and a regular uplink subframe.

FIG. 3 is a block diagram illustrating relative sounding reference signal (SRS) 308a-b allocation in an uplink pilot time slot (UpPTS) 336 and a regular uplink subframe 330. Specifically, FIG. 3 illustrates a configuration where $m_{SRS,0}$ (UpPTS) 322a may be greater than $m_{SRS,0}$ (regular uplink subframe) 322b, i.e., the UpPTS 336 provides a larger available SRS 308a-b bandwidth than a regular uplink subframe 330.

As described earlier, the first symbols in a special transition subframe (i.e., transition between downlink and uplink data subframes in a TDD system) may be used for downlink information, followed by a guard period and uplink symbols.

These uplink symbols in the special transition frame may be referred to as the uplink pilot timeslot (UpPTS) 336. Generally, the UpPTS portion 336 of a special transition subframe may include PRACH format 4 data 338, which is located at the bandwidth edge, up to 18 resource blocks (RBs) on each edge. In other words, the max SRS 308a-b bandwidth in a special transition frame may be the RBs for the UpPTS portion 336 reduced by the PRACH format 4 data 338. Similarly, regular uplink subframes 330 may include physical uplink control channel (PUCCH) data 340a-b. Therefore, the max SRS 308b bandwidth for a regular uplink subframe 330 may be limited by the PUCCH data 340a-b in the uplink subframe 330. Due to PRACH format 4 data 338 and PUCCH data 340a-b, the available SRS 308a bandwidth for a UpPTS portion 336 of a special transition subframe and the available SRS 308b bandwidth for a regular uplink subframe 330 may vary.

For the purpose of illustration, assume that the regular uplink subframe 330 bandwidth is 10 MHz (50 RBs). Table 1 shows one configuration of possible bandwidth configurations for a regular uplink frame, similar to Table 5.5.3.2-2 in the 3rd Generation Partnership Project TS 36.211:

TABLE 1

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 | where $m_{SRS,b}$ is the allocated SRS 308a-b bandwidth for user of type b (i.e., root UE, leaf UE, intermediate UE) and $N_b$ is indicates the number of nodes at the bth level. For example, in SRS 308a-b bandwidth configuration 0 ($C_{SRS}$=0), there may be one root node having 48 RBs, two nodes at level b=1 each with 24 RBs, two nodes at level b=2 each with 12 RBs and three nodes at level b=3 each with 4 RBs. This may be defined based on the number of combs, e.g., two combs may be defined in total.

For example, if PRACH format 4 data 338 occupies 0 RBs (i.e., no PRACH 4 data) and the PUCCH data 340a-b occupies 10 RBs, $m_{SRS,0}$ (UpPTS) 322a may be greater than $m_{SRS,0}$ (regular uplink subframe) 322b. In other words, the UpPTS portion 336 in a special transition subframe may offer more available SRS bandwidth for a root node to send the SRS 308a than a regular uplink subframe 330. Specifically, for a root UE (b=0), the available SRS bandwidth for a UpPTS portion 336 of a special transition subframe ($m_{SRS,0}$ (UpPTS) 322a) may be 48 RBs without any PRACH format 4 data 338 while the available SRS bandwidth for a regular uplink subframe ($m_{SRS,0}$ (regular uplink subframe) 322b) may be 40 RBs when the PUCCH 340a-b occupies 10 RBs. Therefore, FIG. 3 illustrates a case where the UpPTS 336 provides a larger available SRS bandwidth than a regular uplink subframe 330.

Previously, if a UE 102a-c is configured with b=1/2/3 (i.e., leaf/intermediate UEs), $m_{SRS,b}$ (UpPTS) for b=1/2/3 may be forced to be $m_{SRS,b}$ (regular uplink subframe). In other words, non-root (i.e., leaf/intermediate) UEs 102a-c may not be able to utilize all the available UpPTS bandwidth for SRS 308a transmission like root UEs 102a-c. Thus, an unnecessarily small SRS 308a bandwidth may be used for SRS 308a transmission in UpPTS 336 by non-root UEs 102a-c. In other words, leaf or intermediate UEs 102a-c may not be permitted to fully utilize available UpPTS bandwidth when available SRS bandwidth in UpPTS 336 is greater than the available SRS bandwidth in normal uplink subframes 330.

In another example, assume there is a system with 50 RBs bandwidth and for a normal uplink subframe 330, we used 36 RBs for SRS transmission, i.e., configuration 3 in Table 1 ($C_{SRS}$=3). Assume we have 6 RBs for PRACH format 4 in UpPTS 336 so we have 44 RBs excluding PRACH format 4 data 338. Currently, only the root UEs 102a-c can use 40 RBs for SRS transmission while the rest (i.e., leaf and intermediate UEs 102a-c) can only transmit SRS 308a using 36 RBs in the same way as in normal subframe. The reason that 40 RBs are allowed instead of 44 RBs is that we have to pick a configuration with a maximum number of SRS RBs that is less than or equal to 44 according to Table 1, i.e., the first two SRS configurations ($C_{SRS}$=0, 1) require 48 RBs which is larger than 44 RBs. In other words, for SRS 308a transmission, a leaf or intermediate UE 102a-c may select a root UE 102a-c SRS configuration with a maximum number of SRS RBs ($m_{SRS,0}$) that is not greater than the system bandwidth reduced by the amount of allocated PRACH format 4 data 338. Therefore, the present systems and methods allow non-root UEs 102a-c to use the available 40RBs to transmit SRS 308a instead of 36 RBs.

Figure 4:
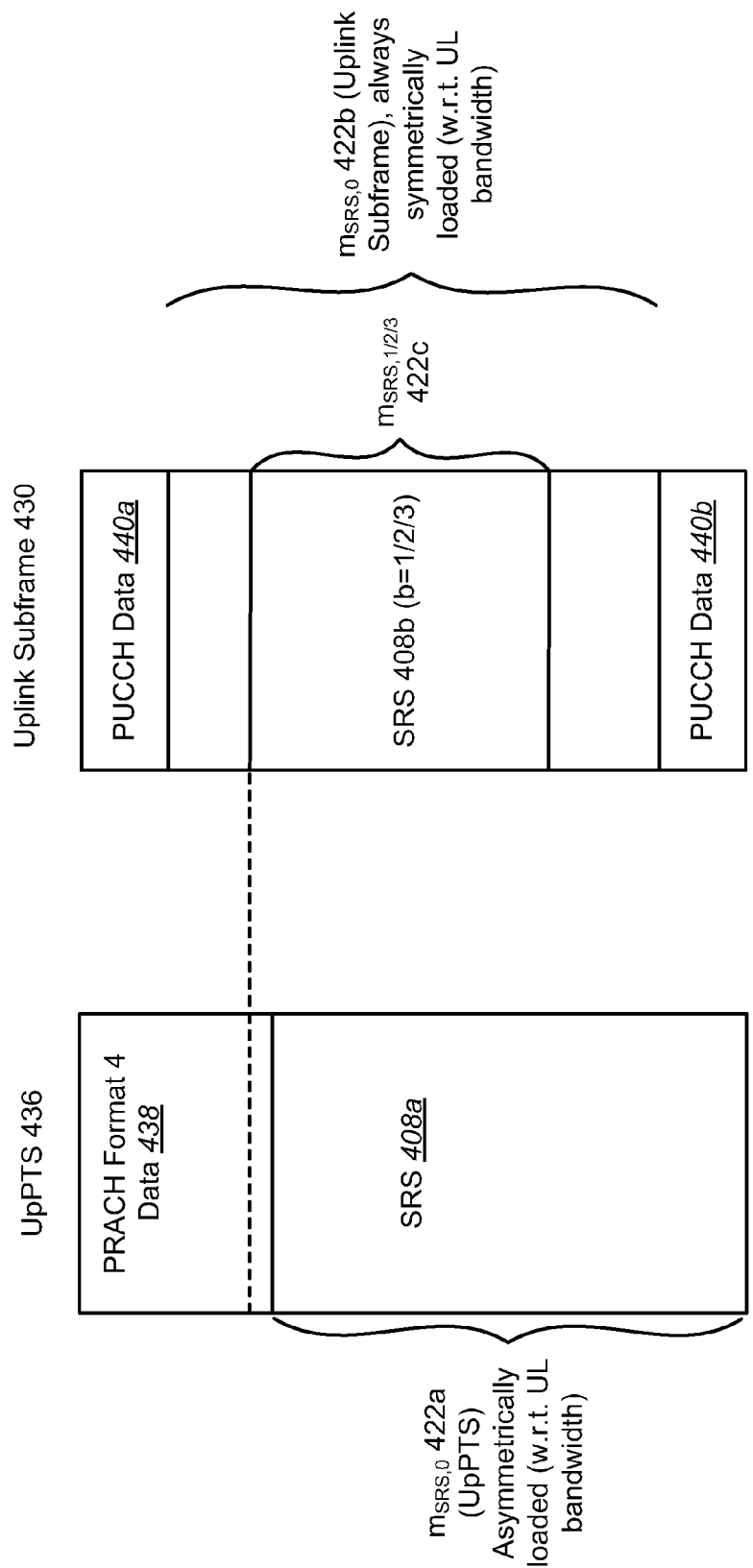
FIG. 4 is another block diagram illustrating available sounding reference signal (SRS) bandwidth in an uplink pilot time slot (UpPTS) and a regular uplink (UL) subframe

FIG. 4 is another block diagram illustrating available sounding reference signal (SRS) 408a-b bandwidth in an uplink pilot time slot (UpPTS) 436 and a regular uplink (UL) subframe 430. However, FIG. 4 illustrates a configuration where $m_{SRS,0}$ (UpPTS) 422a may be smaller than $m_{SRS,0}$ (regular uplink subframe) 422b, i.e., the UpPTS portion 436 may provide less available SRS bandwidth than the regular uplink subframe 430.

For example, if PRACH format 4 data 438 occupies 12 RBs and the PUCCH data 440a-b occupies 10 RBs, $m_{SRS,0}$ (UpPTS) 422a may be smaller than $m_{SRS,0}$ (regular uplink subframe) 422b. Specifically, for a root UE (b=0) 102a-c, the available SRS 408a bandwidth for a UpPTS portion 436 of a special transition subframe (i.e., $m_{SRS,0}$ (UpPTS) 422a) may be 36 RBs when the PRACH format 4 data 438 occupies 12 RBs while the available SRS bandwidth (i.e., $m_{SRS,0}$ (regular uplink subframe) 422b) for a regular uplink subframe 430 may be 40 RBs when the PUCCH 440a-b occupies 10 RBs. Therefore, FIG. 4 illustrates a case where UpPTS portion 436 may provide less bandwidth for SRS 408a-b transmission than the regular uplink subframe 430.

If a UE 102a-c is configured with b=1/2/3 (i.e., leaf/intermediate UEs), $m_{SRS,b}$ (UpPTS) for b=1/2/3 may be forced to be $m_{SRS,b}$ (regular UL subframe) 422c. Furthermore, leaf and intermediate users may also be assigned the same bandwidth location for the regular uplink subframe 430. In other words, non-root users may be assigned the same SRS bandwidth and bandwidth location in UpPTS 436 as though it were transmitting on a regular uplink subframe 430. Since the $m_{SRS,1/2/3}$ 422c (regular uplink subframe) may be symmetrically located in the uplink subframe 430 and $m_{SRS,0}$ (UpPTS) 422a may start from one edge of the UpPTS portion 436 in order to avoid PRACH format 4 data 438, there may be overlap between the PRACH format 4 data 438 and the SRS 408b transmissions in UpPTS 436 for non-root users. According to TS 36.213, SRS 408a-b may be dropped when it conflicts with PRACH format 4 data 438. Therefore, the SRS 408a-b transmitted in UpPTS 436 may be dropped when $m_{SRS,0}$ (UpPTS) 422*a*<$m_{SRS,0}$ (regular uplink subframe) 422*b*.

In the future, SRS 408*a-b* may be more commonly used, e.g., when coordinated multi-point (CoMP) is implemented. Furthermore, PRACH format 4 data 438 may also be more commonly used for small cells, especially remote radio heads (RRHs) in CoMP. Therefore, the problems discussed in FIG. 3 (inefficient use of bandwidth) and FIG. 4 (collisions and dropping of SRS) may become even more impactful. Therefore, the present systems and methods enhance SRS 408*a-b* transmissions to more efficiently utilize bandwidth and avoid collisions.

Figure 5:
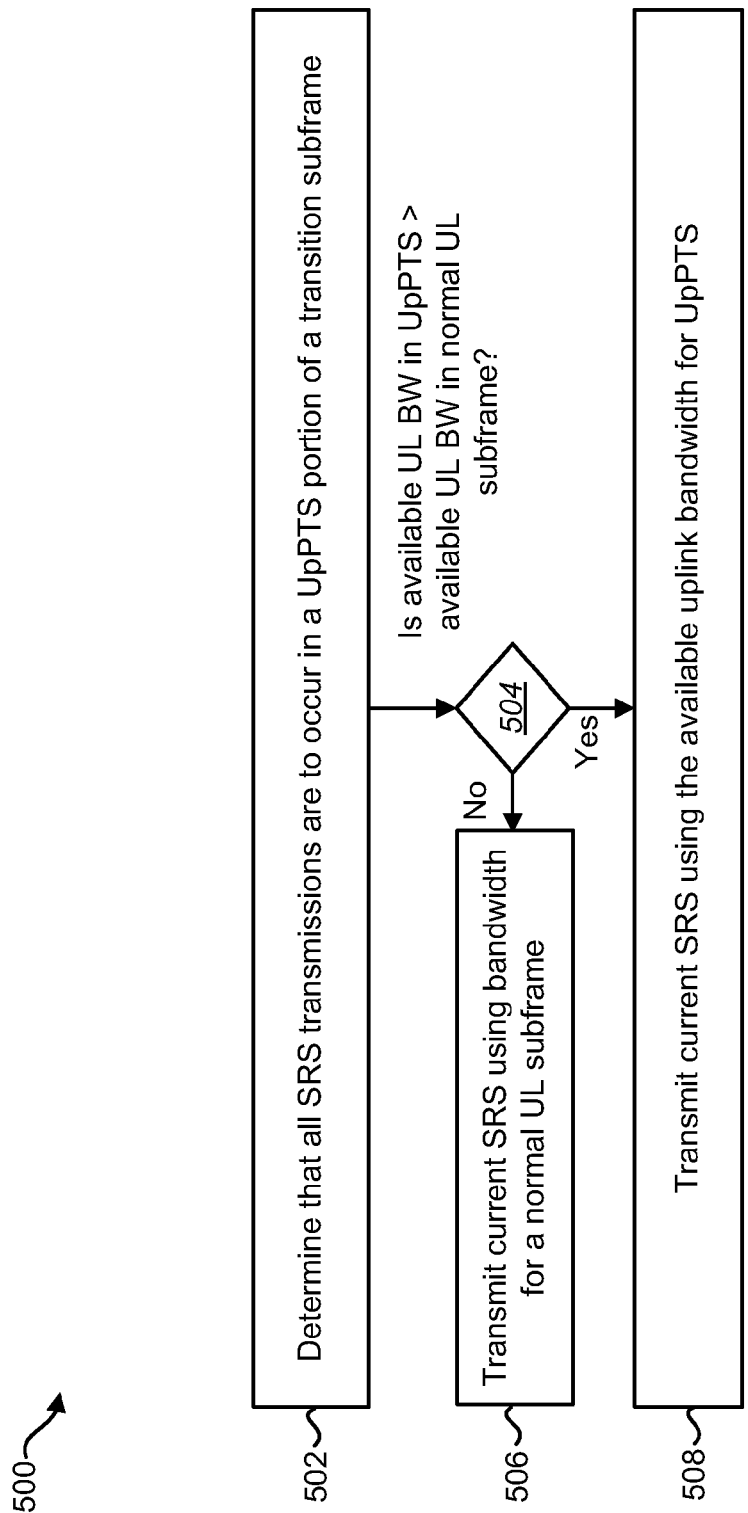
FIG. 5 is a flow diagram illustrating a method for enhancing a sounding reference signal (SRS)

FIG. 5 is a flow diagram illustrating a method 500 for enhancing a sounding reference signal (SRS). The method 500 may enable leaf/intermediate UEs 102*a-c* to fully utilize available UpPTS bandwidth when available UpPTS bandwidth is greater than the available SRS bandwidth in normal uplink subframes. The method 500 may be performed by a UE 102*a-c*. Specifically, the method 500 may be performed by a leaf or intermediate UE 102*a-c*, i.e., a non-root UE 102*a-c*.

The non-root UE 102*a-c* may determine 502 that all SRS 308*a* transmissions are to occur in a UpPTS 336 portion of a transition subframe. This may be accomplished in one of two ways. In one configuration, an eNodeB 110 may determine that all cell-specific SRS 308*a* subframes are to be transmitted only during UpPTS 338 and broadcast this to all UEs 102*a-c* that it serves, e.g., in a cell-specific subframe parameter 112. For example, the text in TS 36.211 might be amended to read (amendments shown in italics at the end):

For UpPTS, $m_{SRS,0}$ shall be reconfigured to $m_{SRS,0}^{max}=\max_{c \in C}\{m_{SRS,0}\} \leq (N_{RB}^{UL}-6N_{RA})$ if this reconfiguration is enabled by the cell-specific parameter srsMaxUpPts given by higher layers, otherwise if the reconfiguration is disabled $m_{SRS,0}^{max}=m_{SRS,0}$, where c is a SRS BW configuration and $C_{SRS}$ is the set of SRS BW configurations for each uplink bandwidth $N_{RB}^{UL}$, $N_{RA}$ is the number of format 4 PRACH in the addressed UpPTS. *For cell-specific SRS subframe configuration 0, reconfiguration of all $m_{SRS,b}$ (b=0/1/2/3/4) is enabled by the cell-specific parameter srsMaxUpPts.*

In another configuration, all SRS 308*a* transmissions for only a single UE 102*a-c* are determined to occur in UpPTS 336. In this configuration, collision avoidance may be implemented via TDM or FDM.

The non-root UE 102*a-c* may also determine 504 whether the available uplink bandwidth in UpPTS 336 (i.e., available UpPTS bandwidth) is greater than the available uplink bandwidth in a normal uplink subframe 330. If no, the non-root UE 102*a-c* may transmit 506 a current SRS 308*b* using the bandwidth for a normal uplink subframe 330. If yes, the non-root UE 102*a-c* may transmit 508 the current SRS 308*a* using available uplink bandwidth for UpPTS 336. In other words, if the available UpPTS bandwidth is greater than the available uplink bandwidth for a normal uplink subframe 330, the non-root UE 102*a-c* may extend the bandwidth used for SRS 308*a-b* transmission, i.e., to the maximum available in UpPTS 336. This may include extending the bandwidth of leaf users at the edge of the bandwidth. In other words, the non-root UE 102*a-c* allocated bandwidth at the edge of the SRS 308*b* bandwidth in a normal uplink subframe may be allocated the newly expanded, adjacent bandwidth in the UpPTS 336 bandwidth. In other words, the non-root UEs 102*a-c* operating at the edge of the bandwidth are able to expand into the newly available bandwidth at the edge.

Figure 6:
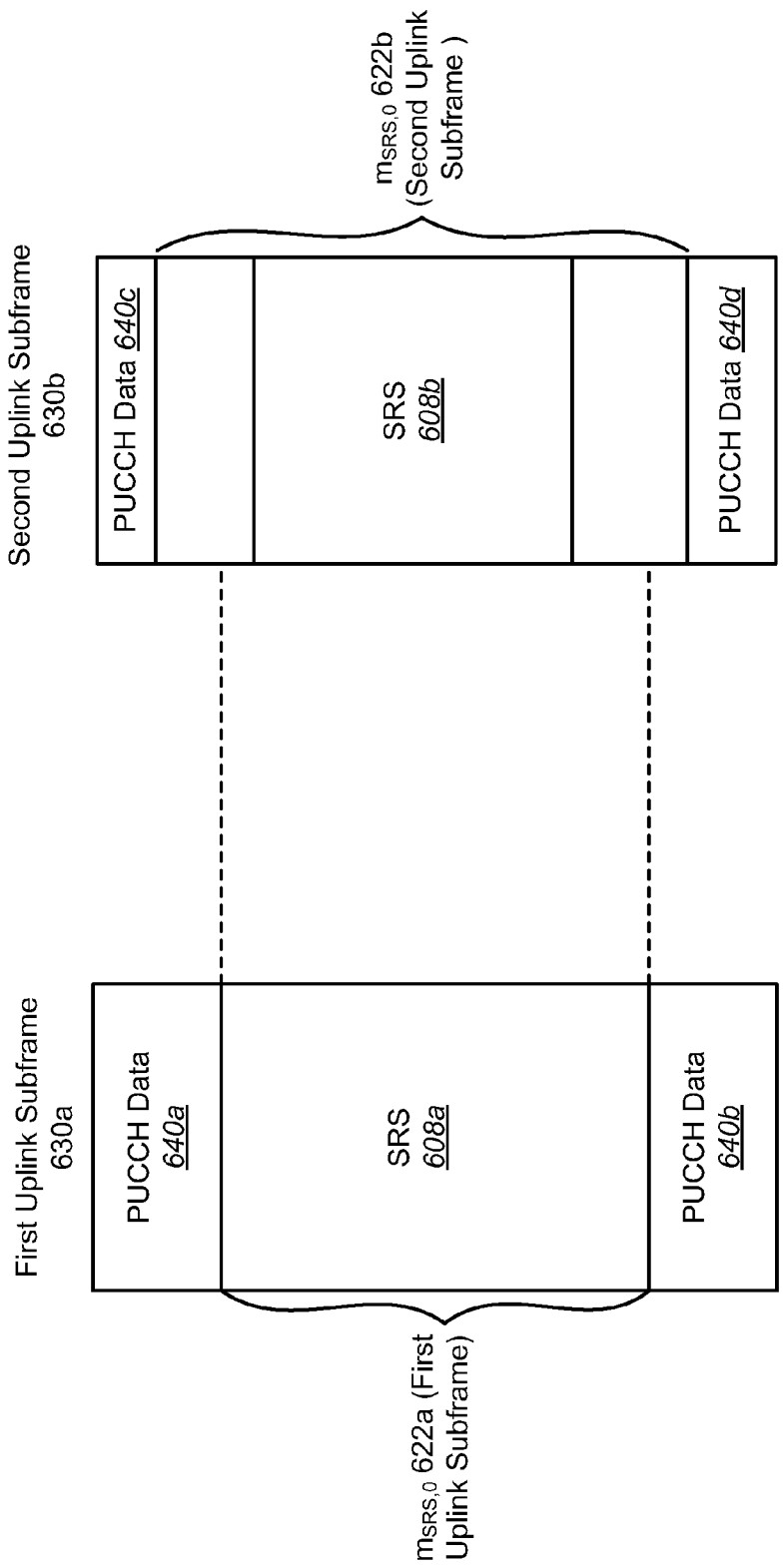
FIG. 6 is a block diagram illustrating uplink subframe dependent sounding reference signal (SRS) bandwidth.

FIG. 6 is a block diagram illustrating uplink subframe-dependent sounding reference signal (SRS) bandwidth. The PUCCH data 640*a-d* bandwidth may change from one subframe 630*a-b* to the next, e.g., in a heterogeneous network. In other words, some uplink subframes 630*a-b* may be configured to carry more uplink control than other uplink subframes, thus, making a subframe-dependent PUCCH 640*a-d* region desirable. For these cases, the SRS 608*a-b* bandwidth may be subframe-type-dependent. For example, the sounding bandwidth may depend on the type of the subframe (i.e., pico or macro) to account for the PUCCH 640*a-d* size. Otherwise, the SRS 608*a-b* may be transmitted using an unnecessarily small bandwidth. For example, $m_{SRS,0}$ 622*a* (first uplink subframe) may be smaller than $m_{SRS,0}$ 622*b* (second uplink subframe) based on the size of the PUCCH data 640*a-d*. If subframe-dependent SRS 608*a-b* bandwidth is not supported, SRS 608*a-b* transmission may use the minimum possible bandwidth over all subframes 630*a-b*, i.e., the worst case scenario. Additionally, if a UE 102*a-c* (or cell) SRS 608*a-b* spans two or more subframe 630*a-b* types, the SRS 608*a-b* bandwidth may be based on the minimum among the subframe types, or still on a per-subframe type basis.

Figure 7:
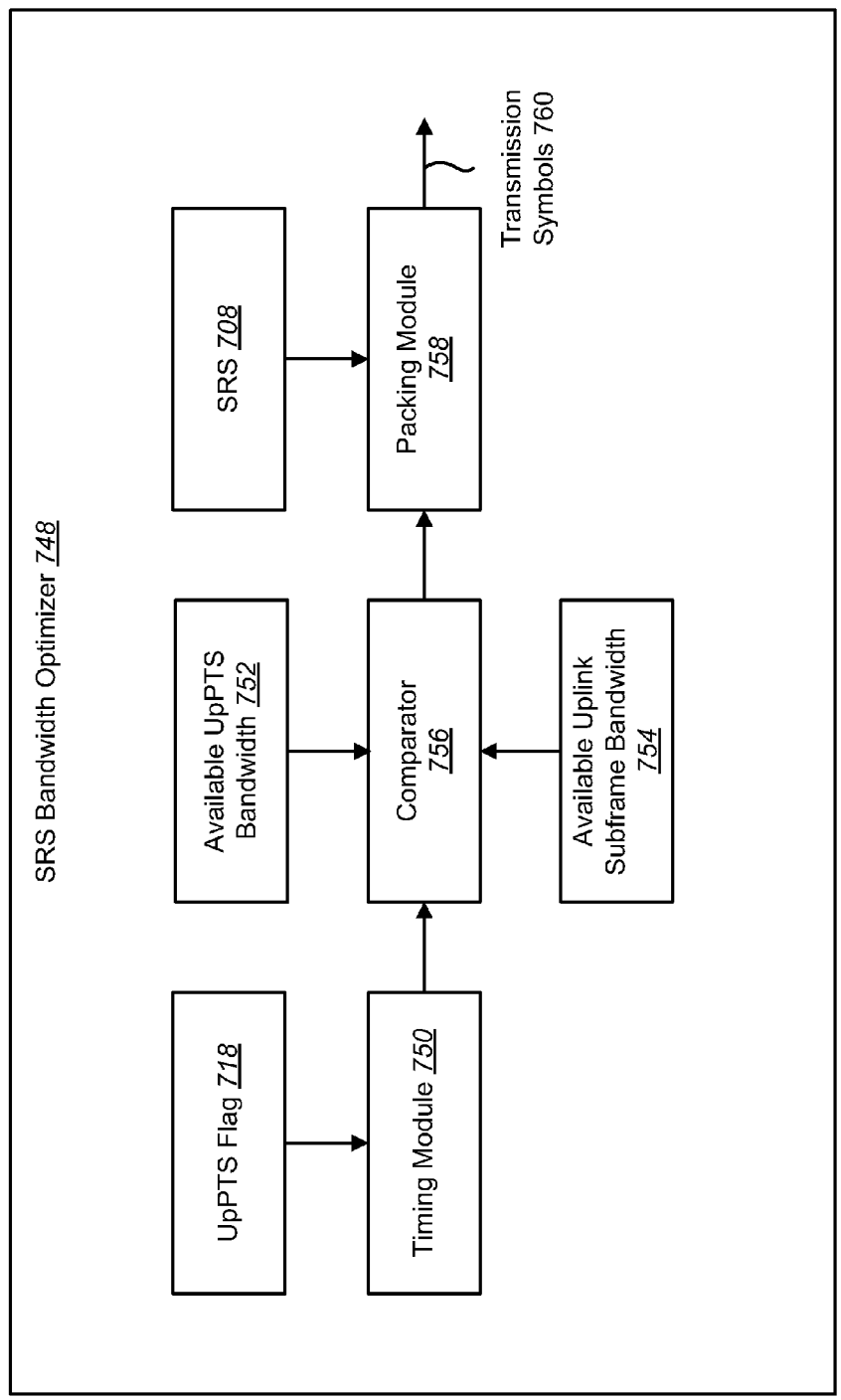
FIG. 7 is a block diagram illustrating an SRS bandwidth optimizer.

FIG. 7 is a block diagram illustrating an SRS bandwidth optimizer 748. The SRS bandwidth optimizer 748 may allow UEs 102*a-c* (including leaf and intermediate) to maximize their bandwidth, e.g., it may perform the method 500 illustrated in FIG. 5. The SRS bandwidth optimizer 748 may be included in a UE 102*a-c* or an eNodeB 110. A timing module 750 may use a UpPTS flag 718 to determine whether all SRS transmissions for a wireless communication device are to occur in a UpPTS portion of a transition subframe. While FIG. 7 illustrates a UpPTS flag 718 (e.g., srsMaxUpPts), any data indicating whether all the UpPTS bandwidth is to be used to transmit the SRS may be used. If yes, a comparator 756 may determine whether available UpPTS bandwidth 752 is greater than available uplink subframe bandwidth 754. When the available UpPTS bandwidth 752 is greater, a packing module 758 may create transmission symbols 760 from the SRS 708 using the available UpPTS bandwidth 752. When the available uplink subframe bandwidth 754 is greater, the packing module 758 may create transmission symbols 760 from the SRS 708 using the available uplink subframe bandwidth 754.

Figure 8:
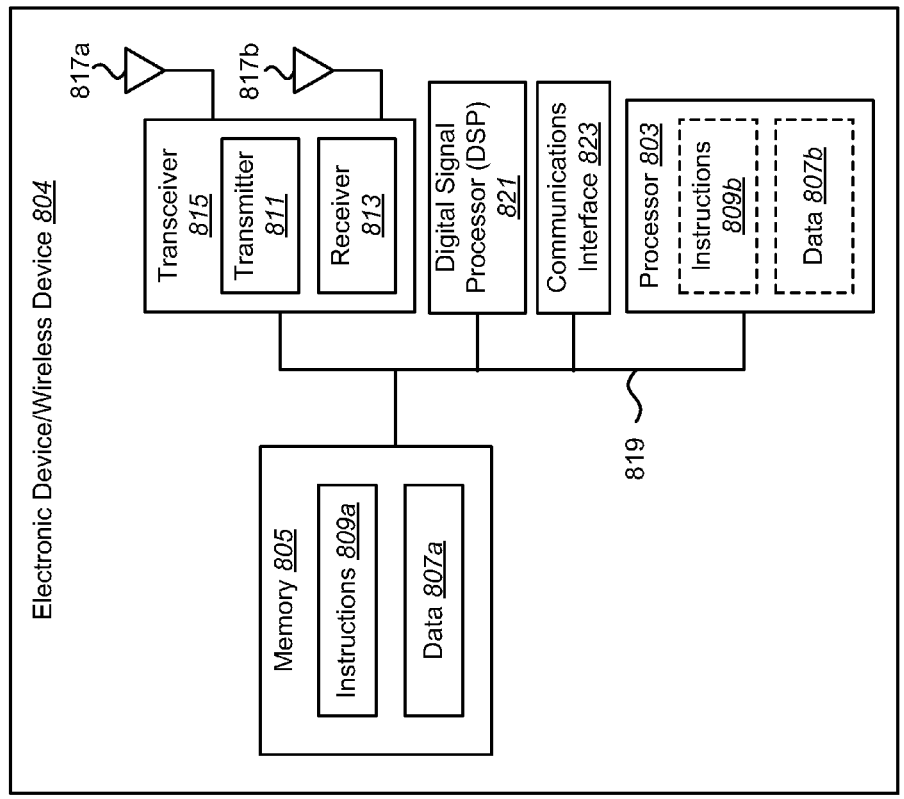
FIG. 8 illustrates certain components that may be included within a wireless device.

FIG. 8 illustrates certain components that may be included within an electronic device/wireless device 804. The electronic device/wireless device 804 may be an access terminal, a mobile station, a user equipment (UE), a base station, an access point, a broadcast transmitter, a node B, an evolved node B, etc. The electronic device/wireless device 804 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the electronic device/wireless device 804 of FIG. 8, in an alternative configuration, a combination of processors (e.g., an ARM and DSP) could be used.

The electronic device/wireless device 804 also includes memory 805. The memory 805 may be any electronic component capable of storing electronic information. The memory 805 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 807*a* and instructions 809*a* may be stored in the memory 805. The instructions 809*a* may be executable by the processor 803 to implement the methods disclosed herein. Executing the instructions 809a may involve the use of the data 807a that is stored in the memory 805. When the processor 803 executes the instructions 809a, various portions of the instructions 809b may be loaded onto the processor 803, and various pieces of data 807b may be loaded onto the processor 803.

The electronic device/wireless device 804 may also include a transmitter 811 and a receiver 813 to allow transmission and reception of signals to and from the electronic device/wireless device 804. The transmitter 811 and receiver 813 may be collectively referred to as a transceiver 815. Multiple antennas 817a-b may be electrically coupled to the transceiver 815. The electronic device/wireless device 804 may also include (not shown) multiple transmitters, multiple receivers, multiple transceivers and/or additional antennas.

The electronic device/wireless device 804 may include a digital signal processor (DSP) 821. The electronic device/wireless device 804 may also include a communications interface 823. The communications interface 823 may allow a user to interact with the electronic device/wireless device 804.

The various components of the electronic device/wireless device 804 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 5, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for enhancing a sounding reference signal (SRS) in a non-root wireless communication device, comprising:
   determining that all SRS transmissions for the non-root wireless communication device are to occur in an uplink pilot time slot (UpPTS) portion of a transition subframe;
   determining whether available uplink bandwidth for the UpPTS portion is greater than available uplink bandwidth for a normal uplink subframe; and
   transmitting a current SRS using the available uplink bandwidth for the UpPTS portion when the available uplink bandwidth for the UpPTS portion is greater than available uplink bandwidth for the normal uplink subframe.

2. The method of claim 1, further comprising transmitting the current SRS using the available uplink bandwidth for the normal uplink subframe when the available uplink bandwidth for the UpPTS portion is not greater than available uplink bandwidth for the normal uplink subframe.

3. The method of claim 1, wherein the determining that all SRS transmissions are to occur in the UpPTS portion comprises receiving an indication from a base station.

4. The method of claim 1, further comprising receiving the available uplink bandwidth for a normal uplink subframe.

5. The method of claim 4, wherein the available uplink bandwidth for a normal uplink subframe accounts for multiple cells in a coordinated multi-point (CoMP) set.

6. The method of claim 1, further comprising receiving the available uplink bandwidth for the UpPTS portion of a transition subframe.

7. The method of claim 6, wherein the available uplink bandwidth for the UpPTS portion accounts for multiple cells in a coordinated multi-point (CoMP) set.

8. The method of claim 7, further comprising receiving a Physical Random Access Channel (PRACH) indicator of a number of resource blocks allocated to PRACH format 4 data for a serving cell, wherein the PRACH indicator also indicates a number of Resource blocks allocated to PRACH format 4 data for at least one non-serving cell in the CoMP set, wherein the indicator is received from the serving cell.

9. The method of claim 7, further comprising:
   receiving an indicator of all cells in the CoMP set from a serving cell; and
   receiving separate PRACH indicators of a number of resource blocks allocated to PRACH format 4 data for each cell in the CoMP set, wherein the PRACH indicators are received from each cell in the CoMP set.

10. The method of claim 7, further comprising receiving an explicit Physical Random Access Channel (PRACH) indicator of a number of resource blocks allocated to PRACH format 4 data for a serving cell and for at least one non-serving cell in the CoMP set, wherein the indicator is received from the serving cell.

11. The method of claim 1, wherein the transmitting comprises allocating extra bandwidth available for the UpPTS portion to wireless communication devices operating on an edge of the available uplink bandwidth for the UpPTS portion.

12. The method of claim 1, further comprising receiving a random access response (RAR) grant that includes a reserved bit that indicates that aperiodic SRS should be triggered.

13. The method of claim 1, wherein the determining that all SRS transmissions for the wireless communication device are to occur in the UpPTS portion comprises determining that all SRS transmissions for all wireless communication devices served by a base station are to occur in the UpPTS portion.

14. An apparatus for enhancing a sounding reference signal (SRS) in a non-root wireless communication device, comprising:
   a processor;
   memory in electronic communication with the processor;
   instructions stored in the memory, the instructions being executable by the processor to:
     determine that all SRS transmissions for the non-root wireless communication device are to occur in an uplink pilot time slot (UpPTS) portion of a transition subframe;
     determine whether available uplink bandwidth for the UpPTS portion is greater than available uplink bandwidth for a normal uplink subframe; and
     transmit a current SRS using the available uplink bandwidth for the UpPTS portion when the available uplink bandwidth for the UpPTS portion is greater than available uplink bandwidth for the normal uplink subframe.

15. The apparatus of claim 14, further comprising instructions being executable to transmit the current SRS using the available uplink bandwidth for the normal uplink subframe when the available uplink bandwidth for the UpPTS portion is not greater than available uplink bandwidth for the normal uplink subframe.

16. The apparatus of claim 14, wherein the instructions being executable to determine that all SRS transmissions are to occur in the UpPTS portion comprise instructions being executable to receive an indication from a base station.

17. The apparatus of claim 14, further comprising instructions being executable to receive the available uplink bandwidth for a normal uplink subframe.

18. The apparatus of claim 17, wherein the available uplink bandwidth for a normal uplink subframe accounts for multiple cells in a coordinated multi-point (CoMP) set.

19. The apparatus of claim 14, further comprising instructions being executable to receive the available uplink bandwidth for the UpPTS portion of a transition subframe.

20. The apparatus of claim 19, wherein the available uplink bandwidth for the UpPTS portion accounts for multiple cells in a coordinated multi-point (CoMP) set.

21. The apparatus of claim 20, further comprising instructions being executable to receive a Physical Random Access Channel (PRACH) indicator of a number of resource blocks allocated to PRACH format 4 data for a serving cell, wherein the PRACH indicator also indicates a number of resource blocks allocated to PRACH format 4 data for at least one non-serving cell in the CoMP set, wherein the indicator is received from the serving cell.

22. The apparatus of claim 20, further comprising instructions being executable to:
   receive an indicator of all cells in the CoMP set from a serving cell; and
   receive separate PRACH indicators of a number of resource blocks allocated to PRACH format 4 data for each cell in the CoMP set, wherein the PRACH indicators are received from each cell in the CoMP set.

23. The apparatus of claim 20, further comprising instructions being executable to receive an explicit Physical Random Access Channel (PRACH) indicator of a number of resource blocks allocated to PRACH format 4 data for a serving cell and for at least one non-serving cell in the CoMP set, wherein the indicator is received from the serving cell.

24. The apparatus of claim 14, wherein the instructions being executable to transmit comprise instructions executable to allocate extra bandwidth available for the UpPTS portion to wireless communication devices operating on an edge of the available uplink bandwidth for the UpPTS portion.

25. The apparatus of claim 14, further comprising instructions being executable to receive a random access response (RAR) grant that includes a reserved bit that indicates that aperiodic SRS should be triggered.

26. The apparatus of claim 14, wherein the instructions being executable to determine that all SRS transmissions for the wireless communication device are to occur in the UpPTS portion comprise instructions executable to determine that all SRS transmissions for all wireless communication devices served by a base station are to occur in the UpPTS portion.

27. An apparatus for enhancing a sounding reference signal (SRS) in a non-root wireless communication device, comprising:
  means for determining that all SRS transmissions for the non-root wireless communication device are to occur in an uplink pilot time slot (UpPTS) portion of a transition subframe;
  means for determining whether available uplink bandwidth for the UpPTS portion is greater than available uplink bandwidth for a normal uplink subframe; and
  means for transmitting a current SRS using the available uplink bandwidth for the UpPTS portion when the available uplink bandwidth for the UpPTS portion is greater than available uplink bandwidth for the normal uplink subframe.

28. The apparatus of claim 27, further comprising means for transmitting the current SRS using the available uplink bandwidth for the normal uplink subframe when the available uplink bandwidth for the UpPTS portion is not greater than available uplink bandwidth for the normal uplink subframe.

29. The apparatus of claim 27, wherein the means for determining that all SRS transmissions are to occur in the UpPTS portion comprise means for receiving an indication from a base station.

30. The apparatus of claim 27, further comprising means for receiving the available uplink bandwidth for a normal uplink subframe.

31. The apparatus of claim 28, wherein the available uplink bandwidth for a normal uplink subframe accounts for multiple cells in a coordinated multi-point (CoMP) set.

32. The apparatus of claim 27, further comprising means for receiving the available uplink bandwidth for the UpPTS portion of a transition subframe.

33. The apparatus of claim 32, wherein the available uplink bandwidth for the UpPTS portion accounts for multiple cells in a coordinated multi-point (CoMP) set.

34. The apparatus of claim 33, further comprising means for receiving a Physical Random Access Channel (PRACH) indicator of a number of resource blocks allocated to PRACH format 4 data for a serving cell, wherein the PRACH indicator also indicates a number of resource blocks allocated to PRACH format 4 data for at least one non-serving cell in the CoMP set, wherein the indicator is received from the serving cell.

35. The apparatus of claim 33, further comprising:
  means for receiving an indicator of all cells in the CoMP set from a serving cell; and
  means for receiving separate PRACH indicators of a number of resource blocks allocated to PRACH format 4 data for each cell in the CoMP set, wherein the PRACH indicators are received from each cell in the CoMP set.

36. The apparatus of claim 33, further comprising means for receiving an explicit Physical Random Access Channel (PRACH) indicator of a number of resource blocks allocated to PRACH format 4 data for a serving cell and for at least one non-serving cell in the CoMP set, wherein the indicator is received from the serving cell.

37. The apparatus of claim 27, wherein the means for transmitting comprise means for allocating extra bandwidth available for the UpPTS portion to wireless communication devices operating on an edge of the available uplink bandwidth for the UpPTS portion.

38. The apparatus of claim 27, further comprising means for receiving a random access response (RAR) grant that includes a reserved bit that indicates that aperiodic SRS should be triggered.

39. The apparatus of claim 27, wherein the means for determining that all SRS transmissions for the wireless communication device are to occur in the UpPTS portion comprise means for determining that all SRS transmissions for all wireless communication devices served by a base station are to occur in the UpPTS portion.

40. A computer-program product for enhancing a sounding reference signal (SRS) in a non-root wireless communication device, the computer-program product comprising a non-transitory computer-readable medium having instructions thereon, the instructions comprising:
  code for causing the non-root wireless communication device to determine that all SRS transmissions for the wireless communication device are to occur in an uplink pilot time slot (UpPTS) portion of a transition subframe;
  code for causing the wireless communication device to determine whether available uplink bandwidth for the UpPTS portion is greater than available uplink bandwidth for a normal uplink subframe; and
  code for causing the wireless communication device to transmit a current SRS using the available uplink bandwidth for the UpPTS portion when the available uplink bandwidth for the UpPTS portion is greater than available uplink bandwidth for the normal uplink subframe.

41. The computer-program product of claim 40, further comprising code for causing the wireless communication device to transmit the current SRS using the available uplink bandwidth for the normal uplink subframe when the available uplink bandwidth for the UpPTS portion is not greater than available uplink bandwidth for the normal uplink subframe.

42. The computer-program product of claim 40, wherein the code for causing the wireless communication device to determine that all SRS transmissions are to occur in the UpPTS portion comprise code for causing the wireless communication to receive an indication from a base station.

43. The computer-program product of claim 40, further comprising code for causing the wireless communication device to receive the available uplink bandwidth for a normal uplink subframe.

44. The computer-program product of claim 43, wherein the available uplink bandwidth for a normal uplink subframe accounts for multiple cells in a coordinated multi-point (CoMP) set.

45. The computer-program product of claim 40, further comprising code for causing the wireless communication device to receive the available uplink bandwidth for the UpPTS portion of a transition subframe.

46. The computer-program product of claim 45, wherein the available uplink bandwidth for the UpPTS portion accounts for multiple cells in a coordinated multi-point (CoMP) set.

47. The computer-program product of claim 46, further comprising code for causing the wireless communication device to receive a Physical Random Access Channel (PRACH) indicator of a number of resource blocks allocated to PRACH format 4 data for a serving cell, wherein the PRACH indicator also indicates a number of resource blocks allocated to PRACH format 4 data for at least one non-serving cell in the CoMP set, wherein the indicator is received from the serving cell.

48. The computer-program product of claim 46, further comprising:
  code for causing the wireless communication device to receive an indicator of all cells in the CoMP set from a serving cell; and
  code for causing the wireless communication device to receive separate PRACH indicators of a number of resource blocks allocated to PRACH format 4 data for each cell in the CoMP set, wherein the PRACH indicators are received from each cell in the CoMP set.

49. The computer-program product of claim 46, further comprising code for causing the wireless communication device to receive an explicit Physical Random Access Channel (PRACH) indicator of a number of resource blocks allocated to PRACH format 4 data for a serving cell and for at least one non-serving cell in the CoMP set, wherein the indicator is received from the serving cell.

50. The computer-program product of claim 40, wherein the code for causing the wireless communication device to transmit comprise code for causing the wireless communication device to allocate extra bandwidth available for the UpPTS portion to wireless communication devices operating on an edge of the available uplink bandwidth for the UpPTS portion.

51. The computer-program product of claim 40, further comprising code for causing the wireless communication device to receive a random access response (RAR) grant that includes a reserved bit that indicates that aperiodic SRS should be triggered.

52. The computer-program product of claim 40, wherein the code for causing the wireless communication device to determine that all SRS transmissions for the wireless communication device are to occur in the UpPTS portion comprise code for causing the wireless communication to determine that all SRS transmissions for all wireless communication devices served by a base station are to occur in the UpPTS portion.

* * * * *